Patented Feb. 18, 1947

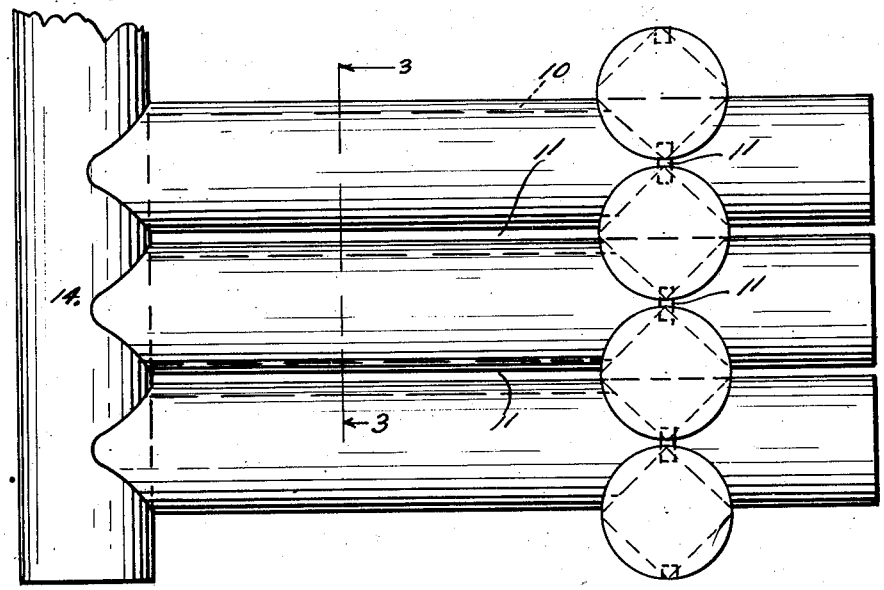
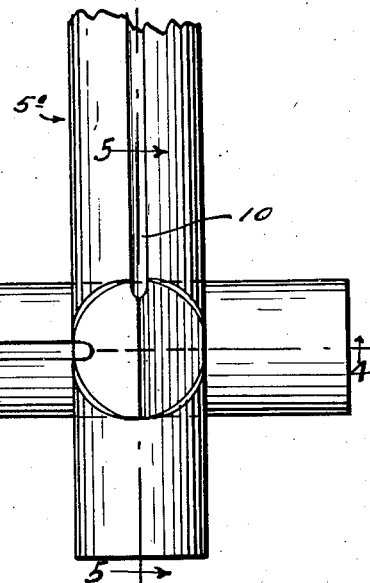
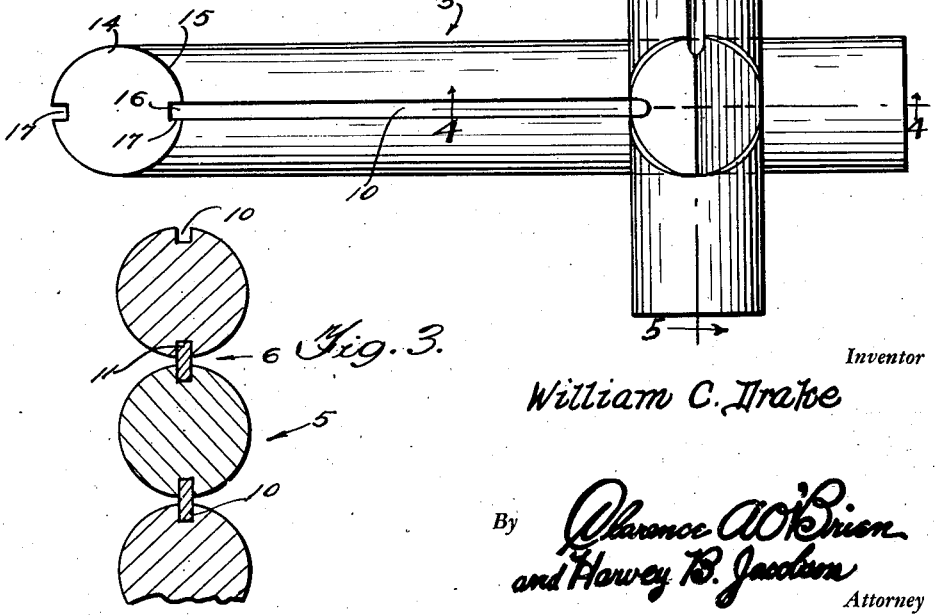

2,416,162

UNITED STATES PATENT OFFICE 2,416,162

LOG CABIN STRUCTURE

William C. Drake, Reno, Nev., assignor to Pioneer Log Cabin Company, Reno, Nev.

Application December 21, 1943, Serial No. 515,125

1 Claim. (Cl. 20—4)

This invention relates to new and useful improvements in log cabin structures, and an object of the invention is to provide a structure of this kind in which the walls are composed of logs arranged one upon the other in horizontal position, said horizontal logs being suitably interlocked at the corners of the building so that they are retained in operative positions without the use of separate securing means.

A further object is to provide a log cabin structure in which the horizontal logs constituting the walls of the structure are substantially alike in configuration and are interlocked in a novel manner at the corners of the building, efficient sealing means being provided between adjacent logs to seal the joints therebetween.

A further object is to provide a log cabin structure composed of horizontal log members arranged one above another in intersecting relation at the corners of the structure, each log member being provided with a transverse slot or groove adjacent one end adapted to receive a longitudinally extending rib of another log arranged in intersecting relation thereto at a corner of the structure, the slot and rib being so formed that the joint between the logs at the corner of the building will be substantially sealed.

Still another object of the invention is to provide a log cabin structure in which the walls are composed of horizontal logs arranged one above the other and interlocked at the corners of the building so that the logs are retained in operative positions without the use of separate securing means and so that the logs of each wall are slightly spaced apart except at the corners of the building, suitable means being provided between adjacent logs of each wall to close the spaces between the logs and to provide sealed joints therebetween.

More specific objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a fragmentary elevational view showing a portion of a log cabin structure constructed in accordance with the present invention.

Figure 2 is a top plan view thereof.

Figure 3 is a vertical section taken on the plane of line 3—3 of Figure 1.

Figure 4:
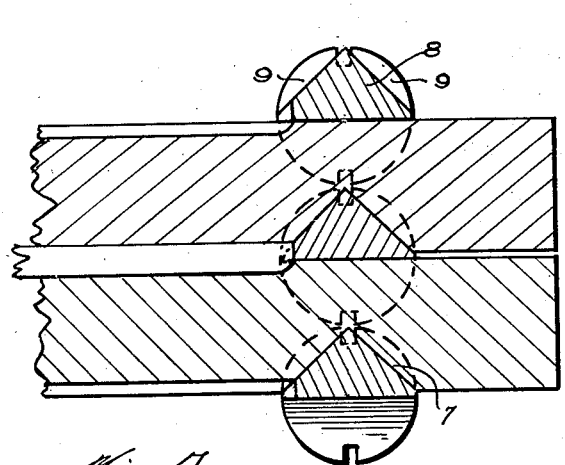
Figure 4 is a section taken on line 4—4 of Figure 2.
Figure 5:
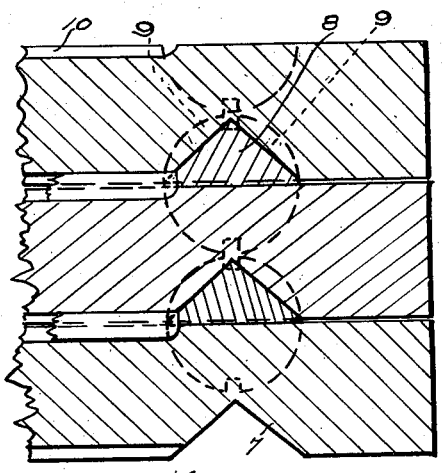
Figure 5 is a section taken on line 5—5 of Figure 2.
Figure 6:
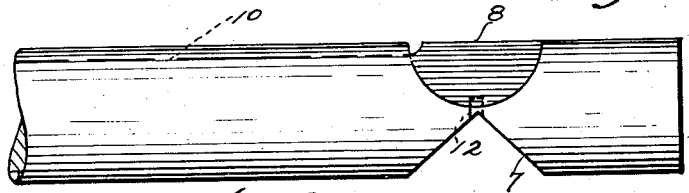
Figure 6 is an elevational view showing an end portion of one of the horizontal logs.
Figure 7:
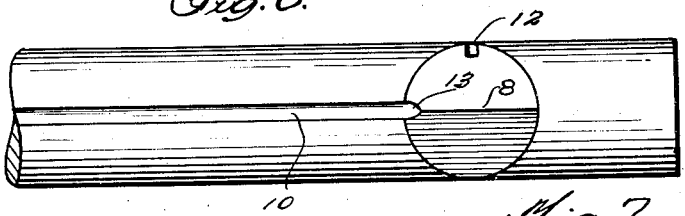
Figure 7 is a top plan view thereof.

Referring in detail to Figures 1 to 7, inclusive, of the drawings, the present log cabin structure includes a wall embodying horizontal logs 5 disposed one above the other, and another wall extending at right angles to the first-named wall and embodying further logs 5a disposed one above another, the logs 5 and 5a being alternated and interlocked where they cross at a corner of the structure so that the logs of each wall are disposed in slightly spaced relation, as indicated at 6, and whereby the logs are retained in operative positions without the use of separate securing means.

As clearly shown in the several views, each of the logs 5 and 5a is provided with a transverse V-shaped notch 7 adjacent an end thereof, disposed directly opposite a longitudinally extending tongue 8 formed by cutting away portions of the material of the log at opposite sides thereof to provide recesses 9 which converge in the same direction as the sides of the notch 7. The tongue 8 is of a size to snugly fit in and project slightly below the notch 7 of the next adjacent log, so that the horizontal logs of each wall are disposed in the slightly spaced relation as mentioned above and indicated at 6.

In order to close the spaces between the adjacent logs of each wall, and to seal the joints therebetween, said logs are provided on the top and bottom sides thereof with longitudinal grooves 10, and a key strip 11 is disposed between each pair of adjacent logs with its longitudinal edge portions received respectively in the bottom groove 10 of one log and in the top groove 10 of the next adjacent log therebelow. The key strips snugly fit in the grooves, and it will thus be seen that they effectively close the spaces between the logs and provide sealed joints therebetween. Each log 5 and 5a is provided in one side thereof, at a point intermediate the ends of the tongue 8 and at the apex of the adjacent V-shaped notch 7 with a vertical groove 12, while the longitudinal groove 10 at the same side as the tongue 8 is extended a short distance into the latter, as at 13. The key strip 11 is made of sufficient length to extend into the groove extension 13 of one log and into the aligned side groove 12 of the log 5 disposed thereon and intersecting the same. Thus, the logs of one wall are effectively interlocked against lateral or longitudinal relative displacement and efficient sealed joints are had at the corner where the logs intersect.

Of course, if the logs 5a intersect the logs of another wall at their other ends, said ends will be constructed the same as the ends shown. However, in places where vertical logs occur, such as at the sides of windows or doors, the other ends of the logs will be of special construction to join with the adjacent vertical log. This has been illustrated with respect to the other ends of the logs 5, and it will be noted that said other ends of logs 5, which cooperate with a vertical log 14, are made of substantially semi-circular form by providing the same with substantially semi-circular vertical grooves, as at 15. Accordingly, these ends of logs 5 partially embrace the log 14, and substantially centrally of the semi-circular grooves 15, the logs 5 are provided with projecting vertical tongues 16 arranged to be received in the longitudinal groove 17 provided in the adjacent side of the vertical log 14. The key strips 11 will of course properly space the logs 5 at the post or upright log 14 and will enter the adjacent groove 17 of the latter. Thus, the adjacent ends of the key strips 11 and the tongues 16 will afford a sealed joint between the horizontal logs and the vertical log 14.

Figures 8, 9:
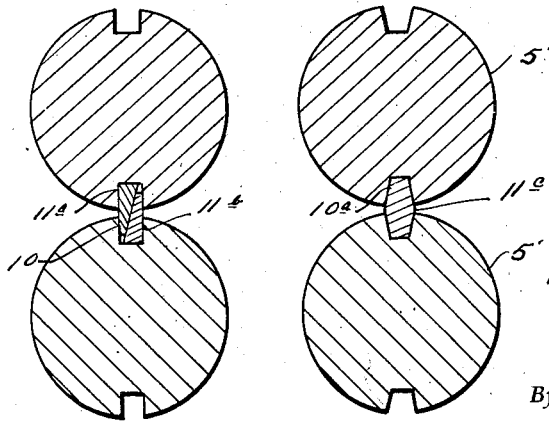
Figures 8 and 9 are views somewhat similar to Figure 3 showing modified forms of the means for closing and sealing the joints between adjacent horizontal logs.

In Figure 8 there is shown a modified form of key strip for use between adjacent horizontal logs, consisting of two longitudinal half-sections of similar form and oppositely tapering cross section. Thus, when one log is laid above another, the sections 11a and 11b will be relatively displaced to increase in thickness with a wedging action, thereby tightly wedging in the opposed grooves 10 of the logs. The tightening of the joint is effected by the mere weight of the logs being superimposed upon each other, and this same general action can be had by the use of a one-piece key strip 11c of the form shown in Figure 9. The key strip of the latter figure merely tapers thicker from the longitudinal edges thereof inwardly to the longitudinal center of the same for reception within somewhat similar shaped longitudinal grooves 10a of the logs 5'.

From the foregoing description, it will be seen that the logs are so interlocked and fitted together at the corners of the structure that the entire wall structure may be erected substantially without the use of nails or other securing means. All of the logs are substantially alike in form except that certain ends of certain logs are specially constructed for cooperation with a vertical log when necessary. Thus, all of the logs of any particular kind are substantially alike in form, so that the logs for a given wall are interchangeable and may be readily and quickly assembled in a relatively short length of time.

What I claim as new is:

In log cabin construction, a log adapted to be employed horizontally in plurality in the fabrication of perpendicularly intersecting walls, said log being formed adjacent one end with a flat sided dihedral tongue having its apex extending longitudinally of the log, and being formed in the same zone but on the opposite side with a flat sided dihedral notch of corresponding angularity, having its apex extending transversely of the log, the apices lying in parallel planes, the depth of the notch being less than half the thickness of the log, said log in the axial plane that embraces the apex of the tongue being provided above and below with longitudinal keyways, the upper keyway extending into said tongue and the lower keyway opening into said notch, said log on one side being formed with a recess so positioned as to be longitudinally traversed by the line of the apex of said notch, said recess constituting an end extension of adjacent longitudinal keyways of upper and lower parallel logs between which said log is interfitted, and adapted to receive the extended end of a key seated in said adjacent keyways.

WILLIAM C. DRAKE.

REFERENCES CITED

The following references are of record in the file of this patent:

UNITED STATES PATENTS

| Number | Name | Date |
|---|---|---|
| 1,287,771 | Schmitt | Dec. 17, 1918 |
| 1,813,455 | Lawton | July 7, 1931 |
| 2,130,231 | Forciea | Sept. 13, 1938 |
| 706,763 | Lange | Aug. 12, 1902 |
| 2,291,712 | Hatton | Aug. 4, 1942 |
| 1,996,735 | King | Apr. 2, 1935 |
| 2,309,149 | Wood et al. | Jan. 26, 1943 |

FOREIGN PATENTS

| Number | Country | Date |
|---|---|---|
| 41,122 | Norwegian | 1925 |